July 27, 1965 W. H. LESLIE 3,197,047
FURNACE CHARGING APPARATUS
Filed June 24, 1963 3 Sheets-Sheet 1

INVENTOR.
WADE H. LESLIE
BY Hobbs & Easton
ATTORNEYS

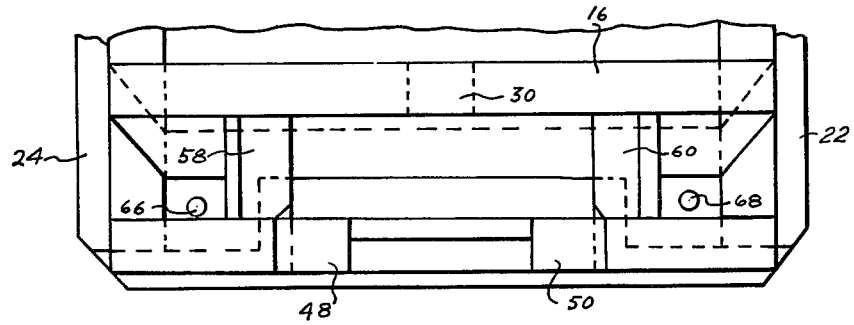
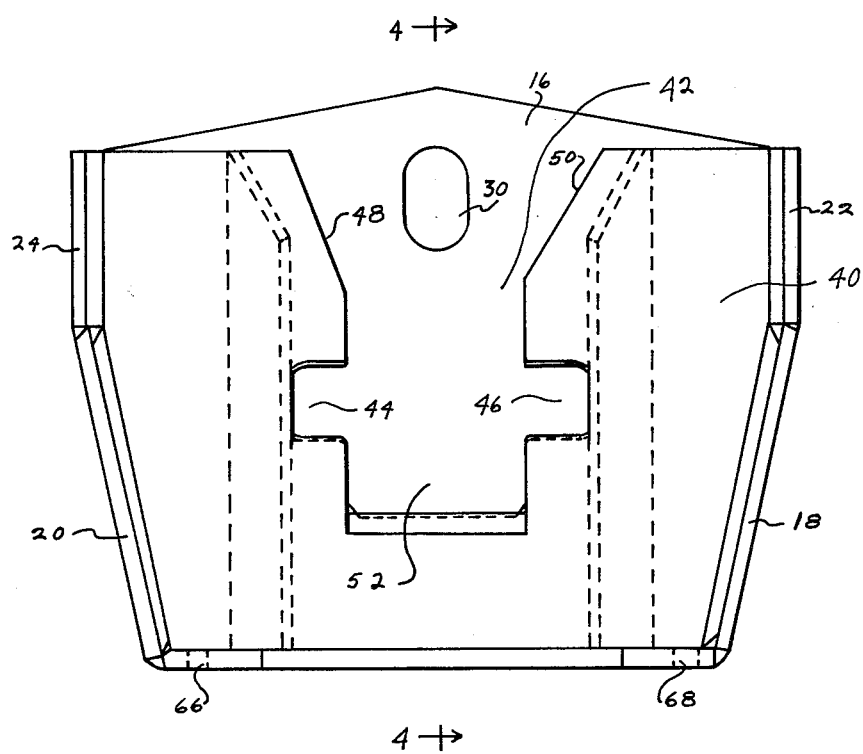

July 27, 1965 W. H. LESLIE 3,197,047
FURNACE CHARGING APPARATUS
Filed June 24, 1963 3 Sheets-Sheet 3
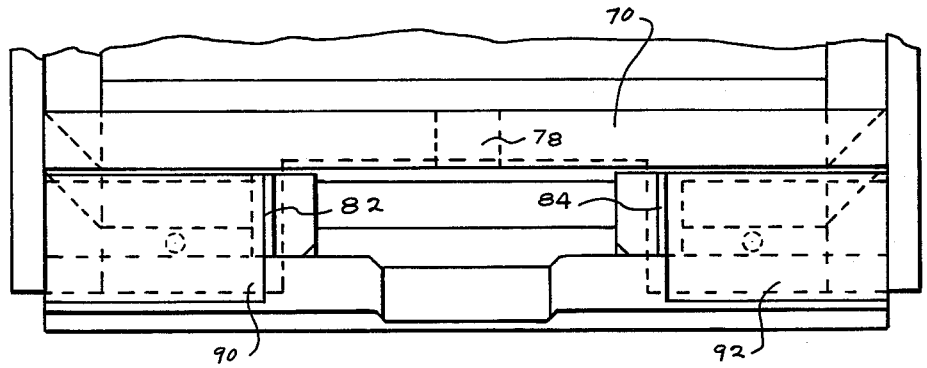
FIG. 6
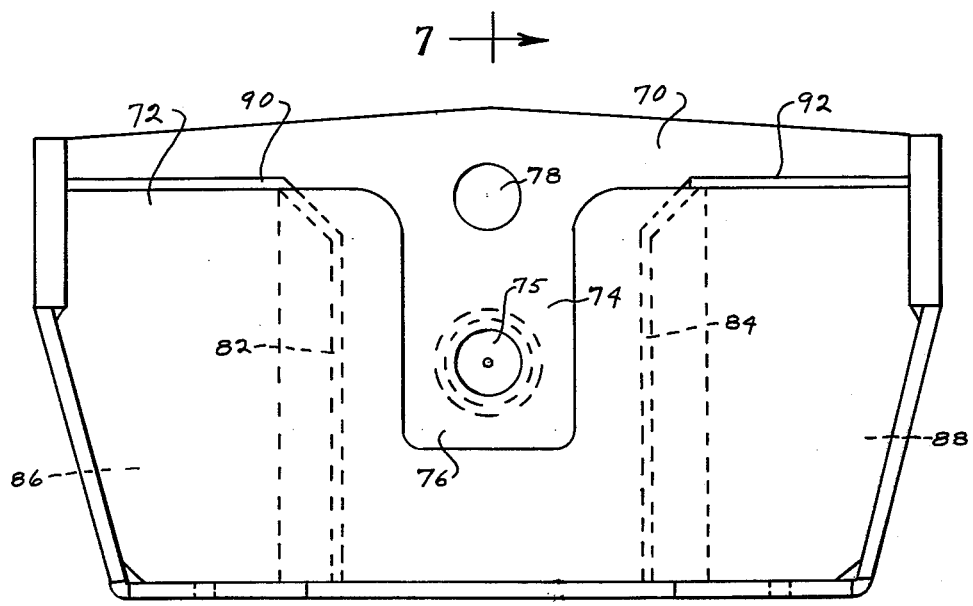
FIG. 5
INVENTOR.
WADE H. LESLIE
BY 
ATTORNEYS United States Patent Office 3,197,047
Patented July 27, 1965

3,197,047
FURNACE CHARGING APPARATUS
Wade H. Leslie, Detroit, Mich.
16734 Kentfield Wayne Company, Detroit, Mich.
Filed June 24, 1963, Ser. No. 289,910
4 Claims. (Cl. 214—26)

The present invention relates to a furnace charging apparatus and more particularly to a charging box for use with steel furnace charging machines.

In the operation of salvaging iron and steel scrap, such as steel shavings, borings and chips, the scrap is place in a charging box on the end of a long reciprocating boom, and the box is inserted through the door of the furnace to a position directly above the crucible or molten metal of previous charges and is then inverted by rotating it on its longitudinal axis, thus emptying the scrap metal contents into the molten metal. After the scrap has been discharged from the charging box, it is withdrawn from the furnace and disconnected from the end of the boom and returned to the scrap pile for another load. The socket on the conventional charging box for receiving the end of the boom often becomes filled and clogged with scrap, which occasionally becomes firmly compacted in the socket, thus interfering with or preventing insertion of the peel head on the end of the boom when the box is to be lifted. Further, as the sockets are now constructed, they tend to accumulate snow and ice when the boxes are stored outside and are therefore temporarily rendered inoperable until the snow and ice are removed. It is therefore one of the principal objects of the present invention to provide a steel furnace charging box having a self-cleaning socket for receiving the end of the boom of the charging machine.

Another object of the invention is to provide a charging box construction wherein the socket for receiving the end of a boom is so constructed that little scrap or other material being handled by the charging machine can find its way into the socket and any scrap and material finding its way into the socket will readily and usually, without any prying or pushing, drop therefrom.

Still another object of the invention is to provide a socket structure in a furnace charging box which is fully and constantly drained and effectively maintained in proper operating condition for receiving the peel head, and which is of rugged and rigid construction to withstand any load of material placed in the box in any normal operation thereof.

A further object is to provide a charging box of the aforesaid type which can easily be fabricated using standard and readily available materials and equipment, and which can economically be maintained in a serviceable condition with little or no special care or attention.

Additional objects of the invention will become apparent from the following description and accompanying drawings, wherein:

FIGURE 2 is an end elevational view of the charging box shown in FIGURE 1;

FIGURE 3 is a fragmentary, top plan view of the charging box shown in the preceding figures;

FIGURE 5 is an end elevational view of a modified form of a charging box embodying the present invention;

FIGURE 6 is a fragmentary top plan view of the charging box shown in FIGURE 5.

Figure 1:
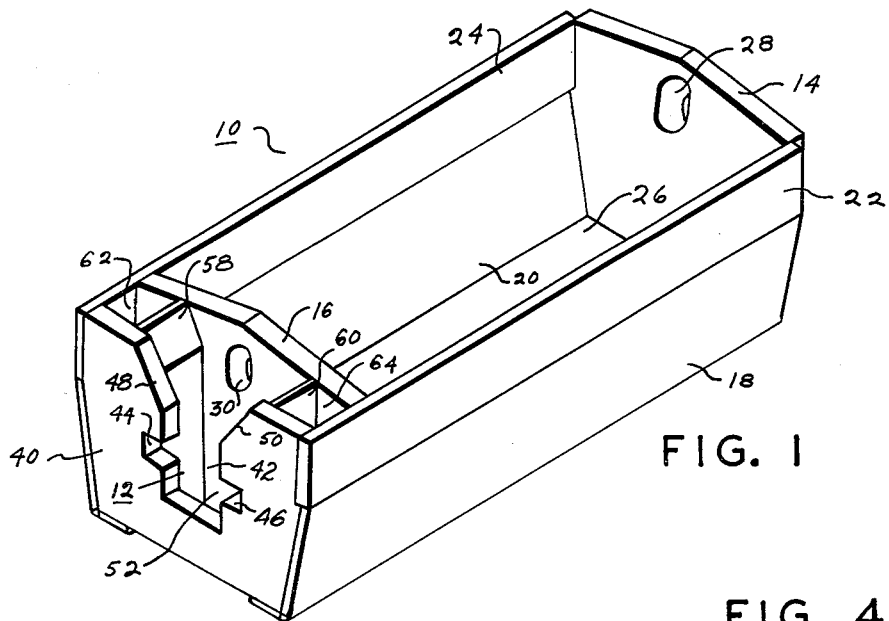
FIGURE 1 is a perspective view of a charging box for a steel furnace, embodying the present invention.

Referring more specifically to the drawings and to FIGURE 1 in particular, numeral 10 designates the present charging box having a socket 12 for receiving the peel head. The box is mounted on the end of a boom or the like and moved longitudinally into the furnace and then rotated to dump the contents therefrom. Various sizes and shapes may be used; however, the one shown in the drawings is considered conventional in this regard.

The charging box shown in FIGURES 1 through 4 is of steel fabricated construction consisting of end plates 14 and 16, lower side panels 18 and 20, and upper side panels 22 and 24 mounted above lower side panels 18 and 20, respectively, and preferably secured thereto by welding. The four side panels are welded to end plates 14 and 16, thus forming a substantially rectangular enclosure having a bottom 26 welded or otherwise secured to the lower edge of side panels 18 and 20 and the lower edges of end plates 14 and 16. End plates 14 and 16 are provided with holes 28 and 30, respectively, for receiving hooks or other fixtures for lifting the box with a hoist when it is being moved to and from the furnace for unloading and reloading. The two end plates, four side panels and the bottom are preferably of steel plate and, when welded together, form a sturdy, rigid structure.

The socket structure 12, shown in FIGURES 1 through 3, for receiving the peel head consists of an auxiliary end plate 40 having a vertical slot 42 extending downwardly from the top in the center thereof and having two laterally extending notches 44 and 46 in opposite sides thereof. The upper edges of slot 42 are beveled laterally, as indicated at numerals 48 and 50. Plate 40 is welded or otherwise rigidly secured to the ends of the four side panels and bottom and hence is held securely in place in the end of the box with sufficient rigidity and strength to support the entire box when the box is fully loaded with scrap or other material. The space between plates 16 and 40, together with slot 42, forms a socket 52 for receiving the peel head or fixture on the end of the boom of the charging apparatus. The bottom beneath socket 52 is provided with an opening 53 to permit pieces of scrap or foreign material entering socket 52 to fall therefrom. End plate 16 slopes forwardly and downwardly, as illustrated at numeral 54, in its lower portion to facilitate a firm grip between the peel head and the socket. However, the lower margin of plate 16 is provided with a reverse curved portion 56 adjacent opening 53 to facilitate removal of the scrap and foreign material from socket 52. The laterally spaced reinforcing members 58 and 60 are positioned on opposite sides of slot 42 and are welded or otherwise rigidly secured to the adjacent sides of end plate 16 and auxiliary plate 40, thus rigidly holding the two plates together and substantially increasing the strength of the two plates for supporting the charging box on the peel head. The two compartments 62 and 64 on the external sides of partitions 58 and 60 are drained by holes 66 and 68, respectively.

Figures 4, 7:
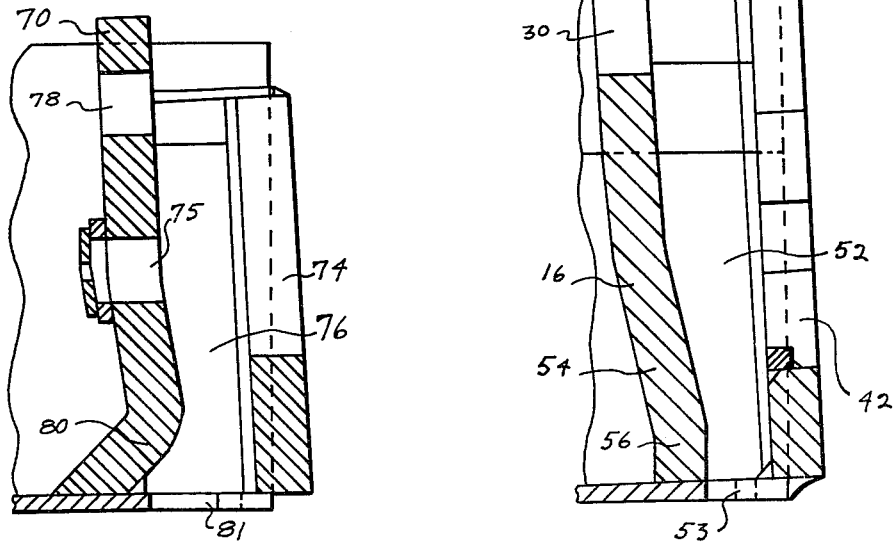
FIGURE 4 is a fragmentary vertical cross sectional view of the charging box shown in the preceding figures, the section being taken on line 4—4 of FIGURE 2.
FIGURE 7 is a fragmentary vertical cross sectional view of the modified form shown in FIGURES 5 and 6, the section being taken on line 7—7 of FIGURE 5.

In the modified form of the present invention as illustrated in FIGURES 5 through 7, numeral 70 designates the end plate corresponding to end plate 16 of the embodiment previously described herein, and numeral 72 designates the auxiliary plate. One of the primary differences between the modified form and the charging box previously described is the socket construction for receiving the peel head. In the modified form, the straight slot 74 in auxiliary plate 72 is used in conjunction with hole 75 and the space between plates 70 and 72 to form a socket 76 for receiving the peel head. A hole 78 is provided in plate 70 for receiving a hook or other lifting means in the same manner as hole 30 in the previous embodiment. In this modified form, the reverse curve in the lower margin 80 is exaggerated, thus improving the ability of the socket 76 to clean itself by permitting the foreign material to pass through opening 81. The side plates and bottom are welded to the sides and edges of end plate 70 and auxiliary plate 72 to form a rigid structure for the peel head and, in combination with the opposite end plate, to form a rugged, rigid structure for handling the iron and steel scrap.

In this embodiment, reinforcing members 82 and 84 are disposed on opposite sides of slot 74 in spaced relation thereto, and the spaces indicated by numerals 86 and 88 between plates 70 and 72 are closed at the top by covers 90 and 92, respectively, the two covers being welded to the upper edge of auxiliary plate 72. The modified charging box of FIGURES 5 through 7 is used in the same manner as the previously described embodiment, and any scrap or other foreign material falling into socket 76 is promptly and effectively discharged through opening 81 in the bottom of the socket. Likewise, any snow or ice entering the socket while the charging box is stored outside passes on through and hence does not accumulate in the form of ice in the socket.

While only two embodiments of the present invention have been described in detail herein, further modifications may be made to satisfy requirements.

I claim:

1. A furnace charging box of the type adapted to be mounted on a peel head comprising a bottom wall, a pair of side walls, a pair of end walls connected along their side and bottom edges with the side and bottom walls, respectively, to form a generally rectangularly shaped receptacle, said side walls at one end thereof extending outwardly beyond one of said end walls and an auxiliary end wall secured to said end of side walls in spaced relation to said one end wall to form a socket therebetween for accommodating the peel head, said socket being open at the bottom thereof, said auxiliary end wall being apertured for interengagement with the peel head within the socket, said one end wall comprising a plate one side of which defines one side of said socket and the other side of which defines one end face of said receptacle, said plate being inclined in a downward direction from its vertical central portion first toward said one end wall and then in a direction away from one end wall, so that the lower half of the socket is of diminishing dimension in a downward direction for a major portion of its height and then of increasing dimension to said open bottom end thereof.

2. A furnace charging box as called for in claim 1, including a pair of vertically disposed reinforcing plates, said plates being imperforate and extending between said one end wall and said auxiliary end wall, one at each side of the aperture in the auxiliary end wall, said reinforcing plates cooperating with said one end wall, said auxiliary end wall, the adjacent side walls and said bottom wall to form a pair of pockets one at each side of the peel head socket, said bottom wall closing the lower end of each pocket and having a pair of relatively small openings therein forming a drain hole at the bottom of each of said pockets.

3. A furnace charging box as called for in claim 2, including means closing the upper ends of said pockets.

4. A furnace charging box as called for in claim 2, wherein said walls and said plates comprise wrought steel members forming a weldment.

References Cited by the Examiner

UNITED STATES PATENTS

| | | | |
|---|---|---|---|
| 792,681 | 6/05 | Taylor | 214—26 |
| 2,347,899 | 5/44 | Forsythe | 214—26 |

HUGO O. SCHULZ, *Primary Examiner.*